United States Patent
Sundaresan et al.

(10) Patent No.: US 12,487,819 B2
(45) Date of Patent: Dec. 2, 2025

(54) AI-DRIVEN PULL REQUEST SUMMARIZATION

(71) Applicant: MICROSOFT TECHNOLOGY LICENSING, LLC., Redmond, WA (US)

(72) Inventors: Neelakantan Sundaresan, Bellevue, WA (US); Alexey Svyatkovskiy, Bellevue, WA (US); Michele Tufano, Bellevue, WA (US); Shuo Zhang, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 18/379,872

(22) Filed: Oct. 13, 2023

(65) Prior Publication Data
US 2025/0045049 A1 Feb. 6, 2025

Related U.S. Application Data

(60) Provisional application No. 63/530,055, filed on Jul. 31, 2023.

(51) Int. Cl.
*G06F 9/44* (2018.01)
*G06F 8/77* (2018.01)
*G06F 16/2457* (2019.01)
*G06N 3/0455* (2023.01)
*G06N 3/0475* (2023.01)

(52) U.S. Cl.
CPC .......... *G06F 8/77* (2013.01); *G06F 16/24578* (2019.01); *G06N 3/0455* (2023.01); *G06N 3/0475* (2023.01)

(58) Field of Classification Search
CPC ... G06F 8/77; G06F 16/24578; G06N 3/0455; G06N 3/0475
See application file for complete search history.

(56) References Cited

U.S. PATENT DOCUMENTS

| | | | |
|---|---|---|---|
| 11,150,877 B2 | 10/2021 | Ivankovic et al. | |
| 11,714,629 B2 * | 8/2023 | Shaastry | G06F 8/71 717/168 |

(Continued)

OTHER PUBLICATIONS

Allamanis, et al., "Self-Supervised Bug Detection and Repair", In Proceedings of 35th Conference on Neural Information Processing Systems, Dec. 6, 2021, 12 Pages.

(Continued)

*Primary Examiner* — Qamrun Nahar
(74) *Attorney, Agent, or Firm* — Workman Nydegger

(57) ABSTRACT

An Artificial Intelligence (AI) driven pull request summarization system utilizes a large language model to classify the code changes of a pull request and to generate a summary of the changes contained in the pull request. The large language model predicts the pull request classification and summarization given a prompt that includes the top-k code changes in the pull request of a repository. The code changes are prioritized based on the most impact that a code change has on the files, methods and classes in the repository. Each of the top-k code changes is linked to a related open issue of the repository, if any. A suggested code reviewer for a code change is then selected from an author or commentator associated with the linked open issue.

20 Claims, 11 Drawing Sheets

(56) References Cited

U.S. PATENT DOCUMENTS

| | | | | |
|---|---|---|---|---|
| 2019/0026106 | A1* | 1/2019 | Burton | G06F 8/71 |
| 2020/0097387 | A1* | 3/2020 | Loyola | G06F 11/3692 |
| 2020/0379879 | A1* | 12/2020 | Plotnik | G06F 8/71 |
| 2024/0427564 | A1* | 12/2024 | Petrov | G06F 8/71 |

OTHER PUBLICATIONS

Bacchelli, et al., "Expectations, Outcomes, and Challenges of Modern Code Review", In Proceedings of 35th International Conference on Software Engineering, May 18, 2013, pp. 712-721.

Chen, et al., "SEQUENCER: Sequence-to-Sequence Learning for End-to-End Program Repair", In Journal of IEEE Transactions on Software Engineering, Sep. 9, 2021, pp. 1943-1959.

Dinella, et al., "DeepMerge: Learning to Merge Programs", In Proceedings of IEEE Transactions on Software Engineering, vol. 49, Issue 4, Apr. 1, 2023, pp. 1599-1614.

Fagan, Michaele., "A History of Software Inspections", In the Book Software Pioneers, 2002, pp. 562-573.

Hong, et al., "CommentFinder: A Simpler, Faster, More Accurate Code Review Comments Recommendation", In Proceedings of the 30th ACM Joint European Software Engineering Conference and Symposium on the Foundations of Software Engineering, Nov. 14, 2022, pp. 507-519.

Jin, et al., "InferFix: End-to-End Program Repair with LLMs", In Repository of arXiv:2303.07263v1, Mar. 13, 2023, 11 Pages.

Li, et al., "Automating code review activities by large-scale pretraining", In Proceedings of the 30th ACM Joint European Software Engineering Conference and Symposium on the Foundations of Software Engineering, Nov. 9, 2022, pp. 1035-1047.

Zhang, et al., "BERTScore: Evaluating text generation with BERT", In Proceedings of Eighth International Conference on Learning Representations, Apr. 26, 2020, pp. 1-43.

Raffel, et al., "Exploring the limits of transfer learning with a unified text-to-text transformer", In Journal of Machine Learning Research, vol. 21, Issue 1, Jan. 1, 2020, 67 Pages.

Svyatkovskiy, et al., "Program merge conflict resolution via neural transformers", In Proceedings of the 30th ACM Joint European Software Engineering Conference and Symposium on the Foundations of Software Engineering, Nov. 9, 2022, pp. 822-833.

Tufano, et al., "An empirical study on learning bug-fixing patches in the wild via neural machine translation", In Proceedings of ACM Transactions on Software Engineering and Methodology, vol. 28, Issue 4, Sep. 2, 2019, pp. 1-29.

Tufano, et al., "Towards Automating Code Review Activities", In Proceedings of IEEE/ACM 43rd International Conference on Software Engineering, May 22, 2021, pp. 163-174.

Tufano, et al., "Using Pre-Trained Models to Boost Code Review Automation", In Repository of arXiv:2201.06850v1, Jan. 18, 2022, pp. 1-12.

Vaswani, et al., "Attention is All You Need", In Proceedings of 31st International Conference on Neural Information Processing Systems, Dec. 4, 2017, 11 Pages.

Wang, et al., "Codet5: Identifier-Aware Unified Pre-Trained Encoder-Decoder Models for Code Understanding and Generation", In Repository of arXiv:2109.00859v1, Sep. 2, 2021, 13 Pages.

* cited by examiner

Task Instructions With Example 202:

As an AI assistant with expertise in programming, you are tasked with generating a summary for a pull request. This involves carefully examining each commit that forms part of the pull request, and analyzing every file that has undergone changes. It's important to note that some files may have errors in their diff summaries.

When analyzing each file, you will encounter several metadata lines within a diff block, similar to the following examples:

Changes in 'server/config.js'

```diff
module.exports = {
dbConfig: {
host: 'localhost',
port: 5432,
- max: 10,
- idleTimeoutMillis: 30000,
- connectionTimeoutMillis: 2000,
+ max: 15,
+ idleTimeoutMillis: 50000,
+ connectionTimeoutMillis: 5000,
}, serverConfig: {
- port: 8080,
+ port: 8000,
},
};
```

This means that the file 'server/config.js' was modified. Note that this is only an example. Then there is a specifier of the lines that were modified. A line starting with '+' means it was added. A line that starting with '-' means that line was deleted.
...

204: SELECTED CODE DIFF HUNKS TO SUMMARIZE:
...

Formatting Instructions 206:

Generate the summary of the pull request, strictly follow a predefined markdown template below:
PR Classification
Provide the reason for the changes: for instance, API change, bug fix, code cleanup, deprecation, design, documentation, a failing test.
PR Summary
Summarize only the most important code changes and the explain the impact. Use itemized lists to output the summary.

*FIG. 2*

Code Diff Hunk 302

```
@@-21,8 +21,9 @@
#include <uninstd.h>
#endif

+#ifndef static_assert
 #define static assert(x, msg) switch ((int x)) case 0: case || (int) (x));
-
+#endif Gt_Frame def_frame;
```

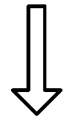

Pull Request Summarization 300

Large Language Model Response 304

PR Classification
Bug Fix

PR Summary
This pull request fixes a bug in the 'src/gifsicle.c' file by adding a '#ifndef static_assert' statement and a '#endif' statement. This ensures that the 'static_assert macro is defined before it is used.

Related GitHub Issue 306

(Open) Collision with OS X Headers #45
Author: @kohler

Recommended Reviewer 308

Mentions and Relevant Issues
Relevant Issue Id: #45
Recommend reviewer: @kohler

*FIG. 3*

NumberListUtility.cs 702

```
using System.Collections.Generic;

public class SquareNumListUtil
{
 public ImmutableList <int> SquareList (List<int> list)
 {
 var resultList = new List <int>( );
     for each (var num in list)
       {
         int square = mathUtils.Square(num);
         resultList.Add(squared);
       }
     return resultList.ToImmutable ( );
}}
```

Program.cs 704

```
using System.Collections.Generic;

class Program
{
 static void Main(string [ ] args)
 {
  var obj = new SquareNumListUtil ( );
  ImmutableList<int> myList = new List <int> (1, 2, 3, 4, 5);
  var result =obj.SquareList (myList);
 }}
```

MathUtils.cs 706

```
using System.Collections.Generic
public class MathUtils
{
 public int Square (int num)
 {
   return num * num;
}}
```

Repository Dependency Graph 708

| UID | Type | Name | Parent | Dependencies |
|---|---|---|---|---|
| 0 | File | NumberListUtility.cs | - | - |
| 1 | Class | SquareNumListUtil | 0 | - |
| 2 | Method | SquareList | 1 | - |
| 3 | File | Program.cs | - | - |
| 4 | Class | Program | 3 | - |
| 5 | Method | Main | 4 | 1,2 |
| 6 | File | MathUtils.cs | - | - |
| 7 | Class | MathUtils | 6 | - |
| 8 | Method | Square | 7 | - |

Code Diff Hunk 710

```
-using System.Collections.Generic;
+using System.Collections.Immutable;

public class SquareNumListUtil
{
- public ImmutableList<int> SquareList (ImmutableList<int> list)
+ public ImmutableList <int> SquareList ( List<int> list)
  {
-    var resultList = new List<int> ( );
+    var resultList = new ImmutableList <int>.Builder ( );
     foreach (var num in list)
       {
-        resultList.Add(num * num);
+        int squared = mathUtils.Square(num);
+        resultList.Add(squared);
       }
       return resultList.ToImmutable ( );
    }
}
```

AI-DRIVEN PULL REQUEST SUMMARIZATION

CROSS-REFERENCE TO RELATED APPLICATION

The present application claims the benefit of the earlier filed provisional application having Ser. No. 63/530,055 filed on Jul. 31, 2023, entitled "AI-Driven Pull Request Summarization," which is incorporated by reference in its entirety.

BACKGROUND

A repository is a centralized digital storage used to store source code and related data (e.g., test files, script files, text files, documents, metadata, etc.) of a project or codebase where access to the files of the repository is shared amongst several developers affiliated with the project. The repository has a distributed version control system that manages and tracks the changes made to the files of the repository. Each developer obtains a full copy of the files in the repository in their own branch. The original code is typically stored in a master branch in a separate computing device. The developer makes changes to their version of a file and the change to the file is noted in a commit. Before the change is merged back into the original file, the change is reviewed using the code review process. A pull request is used to notify others of the change. The pull request is reviewed by one or more code reviewers and once the changes are approved, the changes are merged into the main branch of the repository.

The pull request process is a key aspect to the collaborative development of a software application. However, the process is hampered by the lack of adequate descriptions for a pull request, the volume and complexity of the code modifications, and the lack of code reviewers suitable to review a particular pull request. A description of a pull request description that is unclear impedes the ability of a code reviewer to provide meaningful and actionable feedback. The large volume and complexity of the code modifications requires code reviewers to sift through extensive code diffs to discern the code changes. In larger collaborative projects tracking code changes and assigning appropriate reviewers is a difficult task when the developers having the needed expertise are not known.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An Artificial Intelligence (AI) driven pull request summarization system generates a pull request summarization that prioritizes the code changes of a pull request and generates a classification of the code changes, a natural language summarization of the code changes, a related open issue from the repository and a suggested code review. The system utilizes a large language model to classify the code changes of the pull request and to generate the natural language summary of the code changes. The large language model predicts the pull request classification and summary given a prompt that includes the top-k code changes in the pull request of a repository. The top-k code changes in a pull request are those code changes having the most impact on the files, methods or classes in the repository. The determination of the top-k code changes is based on a dependency graph of the repository which indicates the file, class and method dependencies within the repository.

In addition, the code changes in the pull request are linked to related open issues of the repository, if any. A suggested code reviewer for the code changes is then selected from an author or commentator associated with the linked related open issue.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 2 is a schematic diagram illustrating an exemplary prompt for a large language model to generate a classification and summarization of the code changes in a pull request.

FIG. 3 is a schematic diagram illustrating an exemplary pull request summarization for the code changes.

FIGS. 7A-7B are schematic diagrams illustrating an example of prioritizing the code diff hunks of a pull request.

DETAILED DESCRIPTION

Overview

Figure 1:
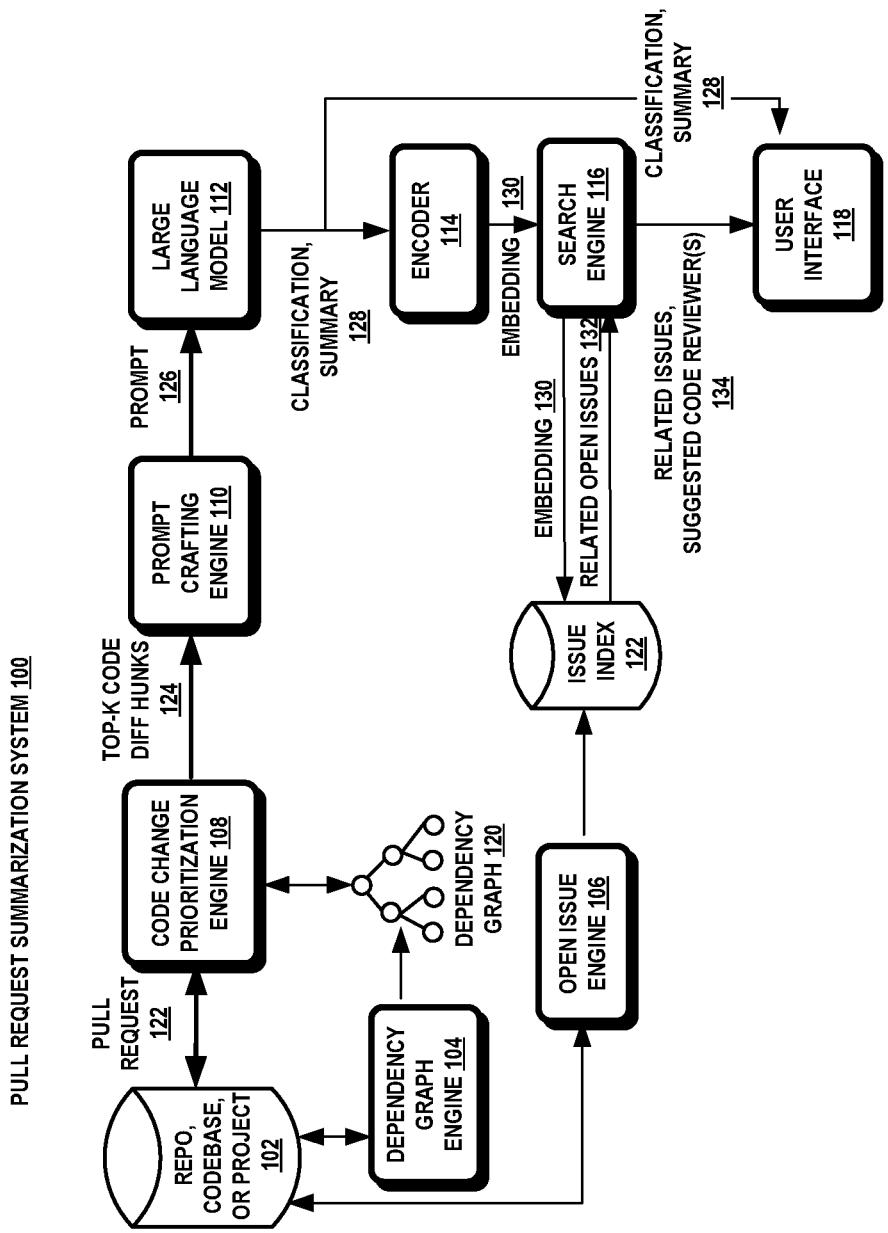
FIG. 1 is a schematic diagram illustrating an exemplary AI-driven system for the automation of a pull request summarization.

Aspects of the present disclosure pertain to the automation of a pull request summarization that includes a classification of the code changes, a summary of the changes in the pull request, a prioritization of the code changes within the pull request, issue linking and suggested code reviewers.

A large language model predicts the pull request classification and summarization given a prompt that includes the top-k code changes in the pull request of a repository. The top-k code changes in a pull request are those code changes having the most impact on the files, methods, and classes in the repository. The determination of the top-k code changes is based on a dependency graph of the repository which indicates the file, class and method dependencies within the repository. Code changes having the most effect on the files, methods and classes of a repository are selected as the top-k code changes.

Each of the top-k code changes in the pull request is labeled with a respective category that describes the type of code change, such as a bug fix, an API change, a fix for a failing test, etc. The pull request summarization describes the top-k code changes in a pull request. The classification and summarization are beneficial for a code reviewer to make an assessment of the pull request.

Pull request summarization differs from a code review. Pull request summarization presents a comprehensive overview of the core functionalities introduced by the pull request and creates a coherent snapshot of the code changes across multiple source code files prioritizing the most relevant changes. By contrast, the code review proposes actionable comments and refinements to the existing code based on a code reviewer's comments.

The large language model is a type of neural-based machine learning model trained on a massively-large training dataset of text and/or source code resulting in the model containing billions of parameters. Due to its extensive training, the large language model has an extensive capability to perform various tasks such as natural language processing, text generation, machine translation, and source code generation.

The large language model is given a user prompt that consists of text in the form of a question, an instruction, short paragraph and/or source code that instructs the model to perform a task and optionally, format of the intended response. In order for the large language model to make a prediction for a task that it has not been trained on or to make a prediction on input not seen during training, the prompt to the model includes the top-k prioritized code changes in a pull request in a code diff format. This helps the large language model to narrow in on the most influential code changes in the pull request resulting in a more accurate pull request summary and classification.

A pull request may consist of a large number of code changes from various files of a repository. The large language model is constrained to the size of the context window which defines the maximum number of tokens the model can take as input when generating responses. For this reason, the code changes are prioritized and the top-k most influential code changes are included in the prompt, where k is a user-defined parameter. The selection of the top-k prioritized code changes enhances the relevance of the predicted pull request descriptions, significantly reduces the cost of goods served and improves the model recall thereby enabling the large language model to serve larger pull requests more effectively.

In addition to the pull request classification and summarization, the system associates relevant issues within a repository with a pull request and recommends suitable reviewers for the pull request.

Attention now turns to a more detailed description of the components, methods, processes, and system for automating code review comments.

System

FIG. 1 illustrates a block diagram of an exemplary pull request summarization system 100. In an aspect, the system 100 includes a code repository, "repo", codebase or project 102, a dependency graph engine 104, an open issue engine 106, a code change prioritization engine 108, a prompt crafting engine 110, a large language model 112, an encoder 114, a search engine 116, a user interface 118, a dependency graph 120 and an issue index 122.

The repository 102 may be a file archive and web hosting facility that stores large amounts of source code and related data either privately or publicly or a project associated with an integrated development environment. The repository 102 can be structured as a version control system, such as GIT, Mercurial, etc. The repository 102 stores source code and the files used to build, test, and maintain a software application or codebase, such as without limitation, test data, script files, metadata, documentation, etc.

The dependency graph engine 104 generates a dependency graph 120 of the repository 102. The dependency graph 120 indicates the dependencies between each file, class and method in the repository 102. The dependency graph 120 is used to determine which code changes have the most impact on the repository 102.

The open issue engine 106 generates an issue index 122 of open issues associated with the repository 102. An open issue is a problem in the repository that has not been resolved. Numerous open-source repositories support issue linking where an open issue is associated with a pull request and possibly other issues. Special keywords in the pull request description are used to identify an issue or the linking may be performed using user interface controls. The open issues from the repository can be extracted and used to form an issue index 122 to these open issues. The issue index includes keys and values. A key is the embedding of the description of an open issue within the repository. A value is an issue number and a list of handles belonging to the issue's author and all who commented on the issue. A handle, such as a GitHub handle, is the username of a GitHub account. The open issue index is used to find related issues and a suggested code reviewer for a code change.

The code change prioritization engine 108 obtains a pull request 122, extracts the code changes from the pull request and prioritizes the code changes. The prioritization is based on how each code change impacts the files, classes and methods of the repository and in particular the heavily-used files, classes or methods in the repository. The code change prioritization engine 108 determines the code changes having the most impact on the repository and outputs them as the top-k code diff hunks 124.

Each code change is represented in a code diff format. The code diff format shows the changes between two files, such as the original source code and the revised version of the original source code, in sequences of lines common to both files, interspersed with groups of differing lines. A code diff hunk is a sequence of changed source code lines, including deleted lines, surrounded by a few unchanged lines or context. The code diff format is an efficient representation of the code changes since the unchanged lines occur only once. The code diff format includes diff characters at the beginning of each line. The diff characters denote changes with "−" and "+" tags and no changes with a blank space. The code diff hunk is a compact and convenient format for showing the code before and the code after the change which includes the editing steps at a given granularity, such as at the line level.

The prompt crafting engine 110 generates a prompt 126 for the large language model 112. In an aspect, the prompt 126 contains instructions on the task to be performed, the top-k code diff hunks of the pull request with corresponding filenames, and formatting instructions for the output generated by the large language model. The instructions on the task to be performed by the large language model includes an example of a code diff hunk and a filename to introduce the task.

In an aspect, the large language model 112 is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention. In an aspect, the large language model is configured as an encoder-decoder neural transformer model with attention having a series of stacked encoder blocks coupled to a series of stacked decoder blocks. In another aspect, the large language model consists only of stacked decoder blocks. In addition, the large language model may be trained to perform different tasks and/or may be configured in different model sizes (i.e., different number of parameters).

In an aspect, the large language model is pre-trained on natural language text and source code. The training of a large language model requires a considerable amount of training data and computing resources which makes it impossible for some developers to create their own models. The large language model consists of billions of parameters (e.g., weights, biases, embeddings) from being trained on terabytes of data. Examples of the large language models include the conversational pre-trained generative neural transformer models with attention offered by OpenAI i.e., ChatGPT and Codex models, PaLM and Chinchilla by Google, and LLaMa by Meta.

The large language model 112 produces a natural language summary of the pull request which explains the code changes of the pull request and associates a classification to the code changes 128.

An embedding 130 of the pull request summary is generated by an encoder 114 and used to search the issue index 122 for related open issues 132. An embedding is a dense numerical representation of the words in the pull request summarization that are expressed as a vector. The embedding may be generated from an encoder, such as a word2vec encoder or a bidirectional encoder representation of transformers (BERT) encoder.

The search engine 116 uses the embedding of the pull request summary to search the issue index 122 for related open issues 132. A related open issue contains the handles of developers having commented on a related open issue or who authored a related open issue. The handles in the related open issues are then used as the suggested code reviewers.

The pull request summary, the code change classification, the issue linking and the suggested code reviewers are then displayed on a user interface 118.

FIG. 2 illustrates an exemplary prompt 200. The prompt 200 includes task instructions 202 which describe the task for the large language model to perform with an example showing the format of a code diff hunk. The instructions indicate how the changes are delineated, such as with the '+' and '−' characters. The prompt 200 also includes the top-k code diff hunks to summarize which are in the code diff format 204 and the output formatting instructions 206. The output formatting instructions 206 indicate the format for the classification and the summarization.

FIG. 3 illustrates an exemplary pull request summarization output 300. The pull request summarization output 300 is associated with a code diff hunk 302 that has changes to the method static_assert. The large language model's response 304 includes the classification of the code diff hunk of the pull request as a BugFix change and produces the following summarization: This pull request fixes a bug in the 'src/gifsicle.c' file by adding a #ifndef static_assert statement and a '#endif' statement. This ensures that the 'static_assert macro is defined before it is used.

The output 300 includes a related open issue 306 and a recommended reviewer 308. The related open issue 306 identifies the username of a developer associated with the related issue. The developer of the related issue is then suggested as a code reviewer 308.

Methods

Attention now turns to a more detailed description of the methods used in the system for code review generation. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
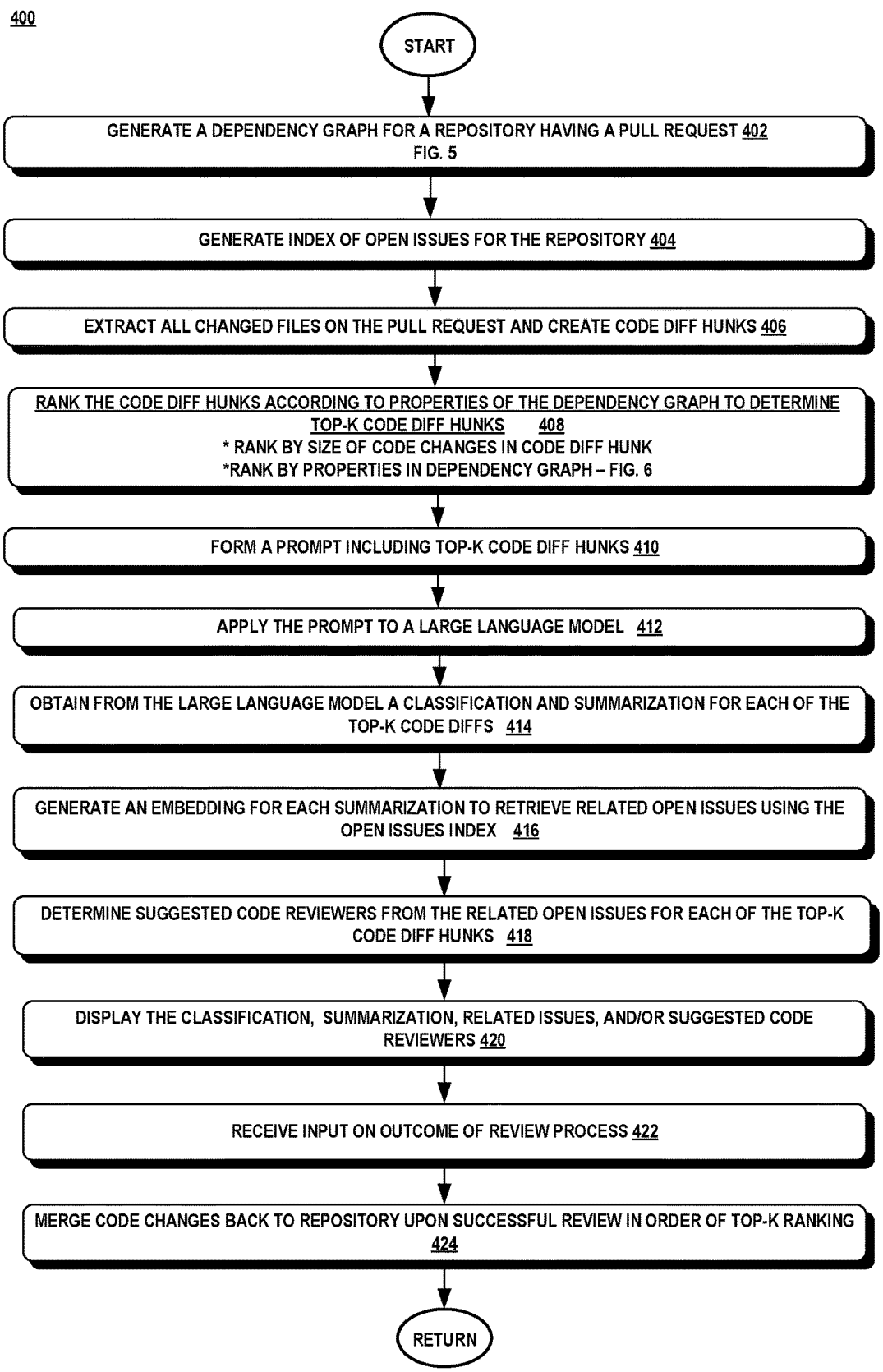
FIG. 4 is a flow diagram illustrating an exemplary method for generating the pull request summarization.

FIG. 4 illustrates an exemplary method 400 for the automatic generation of a pull request summarization. Turning to FIGS. 1 and 4, the dependency graph engine 104 generates a dependency graph 120 for the repository 102 (block 402).

Figure 5:
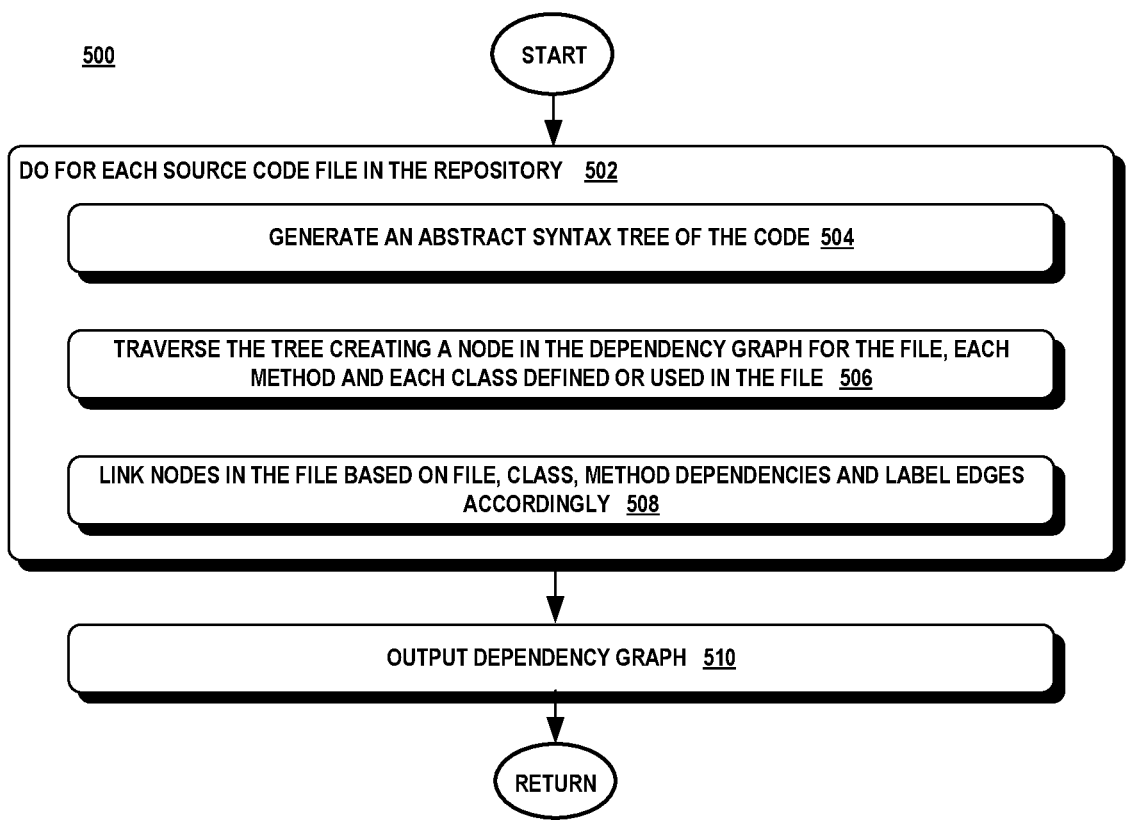
FIG. 5 is a flow diagram illustrating an exemplary method for generating a dependency graph of the repository.

Turning to FIGS. 1 and 5, there is shown a more detailed method for generating the dependency graph.

A node in the dependency graph represents a file, method or class in the repository and an edge between two nodes represents a dependency between the two nodes. There are several properties associated with each node which are as follows: (1) uid: unique node identifier; (2) type: the type of entity modeled, such as file, class or method; (3) name: the name of the entity, such as file name and method name; (4) parent: For methods and classes, the uid of the parent node. For methods, the uid of the corresponding class and for a class, the uid of the file where the class is defined; (5) dependencies: an array of other nodes that a node depends on. Each dependency is an object with two properties: uid of the node that a node depends on and the type of dependency.

There are various types of dependencies between two nodes in the graph: file-level dependencies; class-level dependencies; and method-level dependencies. The file-level dependencies include file-to-file dependency (f_f), class-to-file dependency (c_f), and method-to-file dependency (m_f). Class-level dependencies include class-to-class invocation dependency (c_c_inv), other class-to-class dependencies (c_c), method-to-class invocation dependency (m_c_inv), other method-to-class dependencies (m_c), class-to-method invocation dependency (c_m_inv), and other class-to-method dependencies (c_m). Method-level dependencies include method-to-method invocation dependencies (m_m_inv) and other method-to-method dependencies (m_m).

The dependencies are used to understand how the different parts of the codebase interact with each other. For example, a class might depend on another class if it uses that class's methods or attributes. A method might depend on another method if it calls that method. A file might depend on another file if it imports that file or otherwise uses its contents. These dependencies are key to understanding how code changes to one part of the repository affect other portions of the repository.

The dependency graph engine 104 traverses each file in the repository 102 (block 502) and parses the source code of each file in the code repository into an abstract syntax tree (block 504). The syntax tree of a file is traversed to find nodes that pertain to a file, class, and method. Nodes are created in the dependency graph for each file, class and method found in the syntax tree (block 506). Each node is given a unique identifier, a type, name, and parent (block 506). The dependency graph engine 104 generates a def-use chain to determine the dependencies within the files, classes, and methods of the repository. A dependency is based on definitions and usages of variables, methods, and other code elements in the files, classes and methods of the repository. Each dependency is represented as an edge in the graph between two nodes as noted above (block 508). The dependency graph 120 is then output for use in prioritizing the code diff hunks of a pull request (block 510).

Turning back to FIGS. 1 and 4, the open issue engine 106 generates an issue index 122 for the repository 102 (block 404). Several open-source repositories contain an issue linking feature. For example, in GitHub, a developer can link an issue with a pull request in a default branch using certain keywords found in the pull request's description or commit message. The keywords include close, closes, closed, fix, fixes, fixed, resolve, resolves or resolved. The use of a keyword in a pull request comment in another pull request, links the two pull requests. In an aspect, the repository 102 may include an API or other mechanism to extract all open issues from the repository.

An embedding of each open issue is created by an encoder 114. The embedding is used as a key or index to a value that contains the issue number and a list of handles or user names belonging to the issue's author and other developers who commented on the issue. (Collectively, block 404).

Next, the code change prioritization engine 108 obtains a pull request for the repository 102 and extracts the files containing the code changes of the pull request. The code change prioritization engine 108 transforms the code changes into code diff hunks. (Collectively, block 406).

The code change prioritization engine 108 then ranks the code diff hunks associated with the pull request to determine the top-k code diff hunks (block 408). In real-world scenarios, a pull request consists of numerous code diff hunks spread across various files. The context window of a large language model has a limit on the number of tokens that can be contained in an input sequence thereby limiting the number of code diff hunks that can be provided in the prompt to the large language model. For this reason, the code diff hunks are prioritized in order to select the top-k most influential code diff hunks to incorporate into the prompt. (Collectively, block 408).

There are two distinct approaches for prioritizing the code diff hunks: ranking by size and ranking by graph properties. In ranking by size, the code diff hunks are ranked by the number of lines added or removed in the code diff hunks. Although this approach is intuitively appealing, it fails to encapsulate the concept of a code change's influence on the repository and its ensuing impact on the entire code base. (Collectively, block 408).

The task of quantifying the "influence" of a code change within a pull request is challenging and is why the dependency graph is used. When a pull request amends parts of the code upon which other segments heavily rely, those changes are likely to be highly influential. The ranking by graph properties approach matches a code diff hunk to an associated graph node of the dependency graph.

Figure 6:
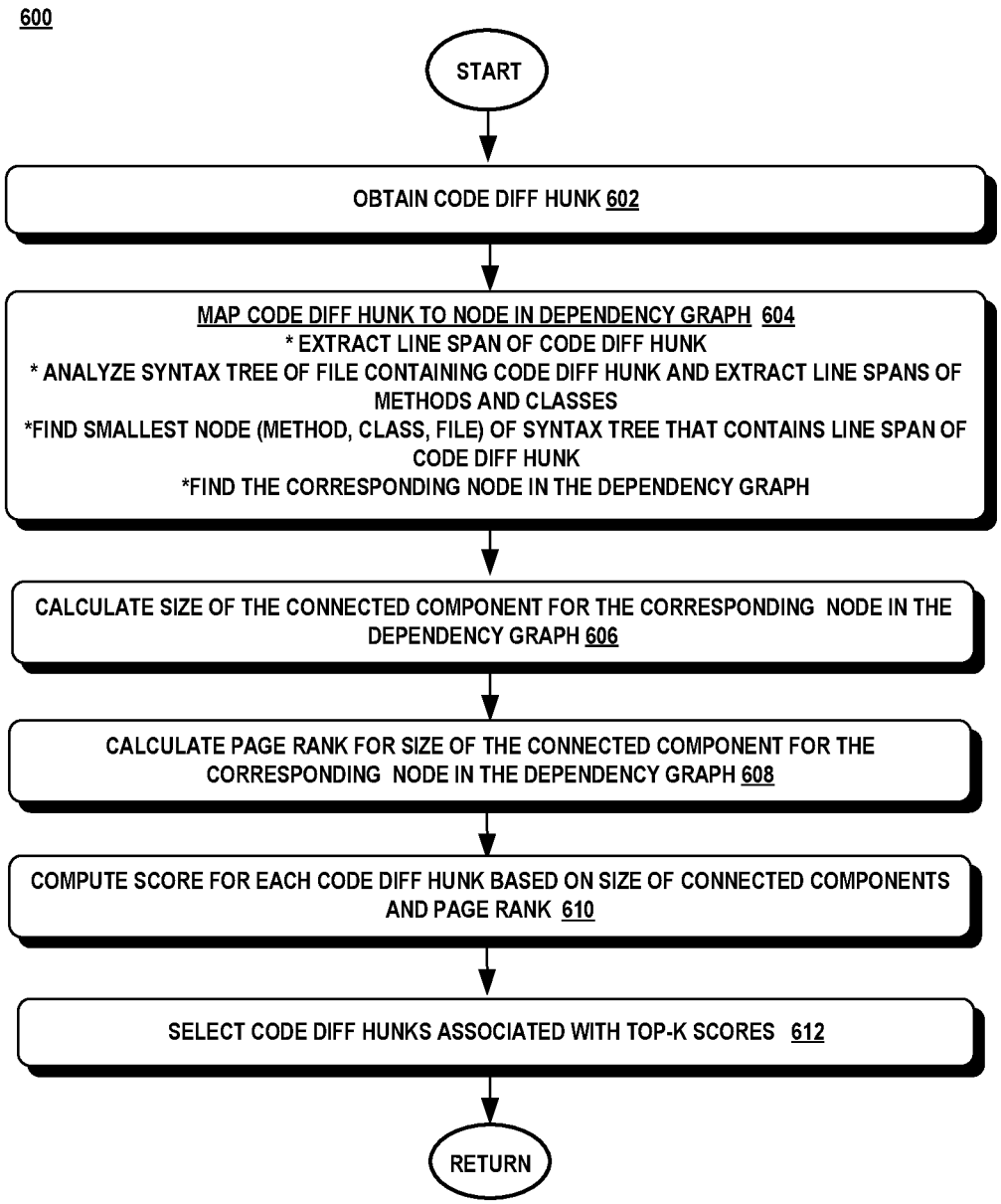
FIG. 6 is a flow diagram illustrating an exemplary method for prioritizing the code diff hunks of a pull request.

Turning to FIG. 6, there is shown an exemplary method 600 for prioritizing the code diff hunks. A code diff hunk is obtained (block 602) and mapped to a node in the quantifying dependency graph (block 604).

The line span of the code changes is obtained from the code diff hunk. The line span consists of two integers: the starting line index and the ending line index, where the starting line index is the line number counted from the beginning of the file where the span begins and the ending line index is the line number where the span concludes. The syntax tree of the file containing the code diff hunk is analyzed to extract the methods and classes that overlap with the line spans of the code diff hunk. The lowest-ordered node of the syntax tree overlapping with the code diff hunk is obtained. The code elements of the nodes of the syntax tree are ranked from a highest rank to a lowest rank, with a node representing a file having a highest rank, a node representing a class having a second highest rank and a node representing a method having a lowest rank. The method finds the node of the syntax tree that corresponds to the lowest-ranked node of the syntax tree of the file containing the code diff hunk. The name corresponding to the lowest-ranked node is used to find the node with the closest similar name in the dependency graph. (Collectively, block 604).

The similarly-named node in the dependency graph is then used to generate a score for the code diff hunk. The score is based on the size of the connected components to the node in the dependency graph to which the code diff hunk belongs. The intuition behind this is that if a node belongs to a larger connected component than a change introduced in this node is more important across different parts of the repository. (Collectively, block 606).

The size of the connected components is determined using a tree traversal technique. For example, a breadth-first traversal of the dependency graph is performed starting from the node in the dependency graph to which the code diff hunk belongs. The traversal is used to count the number of edges connected to the node in the dependency graph to which the code diff hunk belongs. (Collectively, block 606).

In addition, a PageRank is used as a secondary ranking metric since the probability of multiple code diff hunks that belong to the same connected component may be large. The PageRank metric or value for a node u of the dependency graph is dependent on the PageRank values for each node v contained in the set B(u), the set containing all nodes linking to, divided by the number N(v) of links from node v. Hence, the PageRank of a node N in the dependency graph is calculated by the following formula:

$$\text{PageRank}(N) = (1-d) + d * \sum_{M \in L(N)} \frac{PR(M)}{C(M)},$$

where d is a damping factor set to 0.85; L(N) is the set of nodes that link to N, PR(M) is the PageRank of node M; C(M) is the number of outgoing links from node M. (Collectively, block 608).

Each code diff hunk is assigned a score which represents the sum of the connected components and the PageRank value (block 610). The code diff hunks having the k highest scores are selected for input into the prompt, where k is a user-defined value (block 612).

Turning back to FIGS. 1 and 4, the prompt crafting engine 110 receives the top-k code diff hunks and incorporates them into a prompt. The prompt includes the task instructions, the top-k code diff hunks, and the output formatting instructions (Collectively, block 410).

The prompt is applied to the large language model 112. In an aspect, the large language model 112 is hosted on a web server and accessed over the Internet via APIs. Alternatively, the large language model 112 may be located in the same computing device as the source code repository or in the developer's computing device (Collectively, block 412).

The large language model 112 returns a response that includes a classification for each of the top-k code diff hunks and a corresponding summary (block 414).

The encoder 114 generates an embedding 130 for the summary (block 416). The search engine 116 uses the encoder-generated embedding to search the issue index 122 for issues in the repository having an embedding that closely matches the embedding of the summary. In an aspect, the search engine 116 uses a distance measure to determine the closest matching embeddings, such as Euclidean distance, cosine similarity, k-means clustering, and the like. A closest-matching embedding in the issue index 122 points to related open issue which is extracted from the repository (Collectively, block 416).

The retrieved related open issue contains a handle or username of an author or other developer associated with the related issue. This handle is used to identify a suggested code review for the code changes (Collectively, block 418).

The classification, summarization, related open issues, and suggested code reviewers for the pull request are presented in a user interface for a user (i.e., developer, author, code reviewer, etc.) of the repository (block 420). In an aspect, the user interface may be the pull request description portion of the pull request.

In an aspect, input from the user may be received regarding the outcome of the code review process (block 422). Upon a successful outcome of the code review for a code change, the code change is merged back to the repository (block 424). The code changes may be merged back in the order of the top-k ranking (block 424).

Turning to FIG. 7A, there is shown an example of a C# project and its dependency graph in a tabular form. The C# project consists of three source code files: NumberListUtility.cs 702, Program.cs 704, and MathUtils.cs 706. The NumberListUtility.cs 702 file defines a single class, SquareNumListUtil, which contains a method named SquareList. The SquareList method takes a list of integers as an argument and returns a new list where each element is the square of the corresponding element in the input list.

Program.cs is the main entry point of the program. Program.cs instantiates SquareNumListUtil, creates a list of integers, and calls the SquareList method of the list. The MathUtils.cs file defines a utility class, MathUtils, with a method Square. The Square method takes an integer and returns the square of the integer. Currently, this utility class is not utilized in the other files of the project.

Figure 7B:
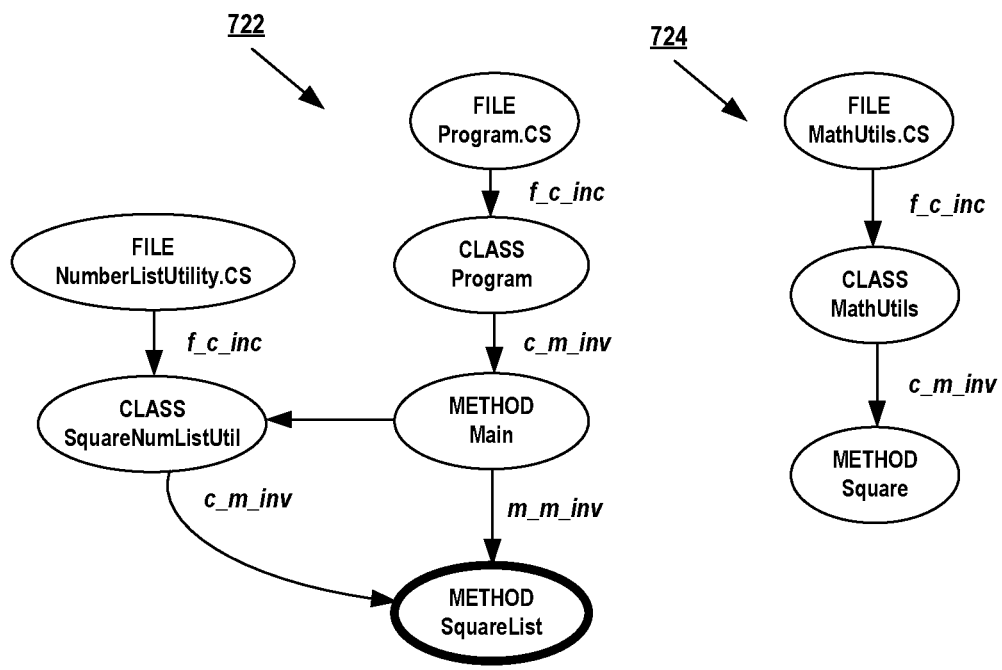

The graph representing the dependencies between the components of the project is shown in FIG. 7B. There are two main subtrees of the graph: subtree 722 contains the files, classes and methods having dependencies derived from Program.cs and subtree 724 which contains the file, class and method having dependencies derived from MethodUtils.cs. Each node in either subtree represents a file, class or method. An edge from one node to another node represents a dependency, such as file-to-file (f_f_unk), file-to-class (f_c_inc), class-to-method invocation (c_m_inv) or method-to-method invocation (m_m_inv).

As shown in FIG. 7B, Program.cs has a file-to-class dependency with the class Program, the Program class has a class-to-method invocation dependency with the method Main, and the method Main has a method-to-method invocation dependency with the method SquareList. The file NumberListUtility has a file-to-class dependency with the class SquareNumListUtil. The class SquareNumListUtil has a class-to-method dependency with the method SquareList. The file MathUtils.cs has a file-to-class dependency with the class MathUtils which in turn has a class-to-method invocation dependency on method Square.

In alternative aspects, the dependency graph may also be formulated as a table 708 shown in FIG. 7A. The table includes the unique ID of a node (UID), the type (e.g., file, class, method), name (e.g., filename, class name, method name), parent node, and dependent nodes. As shown in table 708, there are nine nodes with a UID. Each node is associated with a type (file, class, or method), a name of the associated file, class or method, a parent link and a dependent link. For example, UID 2 represents a method named SquareList that has as a parent, UID 1, which is the class SquareNumListUtil. The SquareNumListUtil class has as its parent, the file NumberListUtility.cs.

A pull request to the repository is introduced having code diff hunk 710 which makes the following changes:
(1) There is a change in the import section 712. The System.Collections.Generic namespace was replaced with System.Collections.Immutable. This means the code now imports and uses ImmutableList int type from the System.Collections.Immutable namespace instead of List int from System.Collections.Generic.
(2) There is a change in the input parameter type of the SquareList method 714. The type of the SquareList method's input parameter list was changed from ImmutableList <int> to List <int>.
(3) The type of the local variable resultList was changed from List <int> to ImmutableList<int>.Builder 716. This change aligns with the newly imported System.Collections.Immutable namespace.
(4) An instance of the MathUtils class is now created inside the SquareList method 718. This instance is used to call the Square method for squaring the numbers.
(5) There is a change in the for-each loop. Instead of directly squaring the number and adding it to the resultList, the number is first squared using the Square method of the MathUtils class 718. The squared number is stored in a local variable squared and then added to resultList.
(6) Despite the change in the type of resultList, the return type of the SquareList method remains ImmutableList<int> as the ToImmutable( ) method is called on resultList before returning it 720.

Turning to FIG. 7B, the dependency graph shows two components 722 and 724. Code diff hunk 712 is mapped to the node file NumberListUtility.cs in the dependency graph which has a connected component score of 1, a PageRank score of 0.052, and a combined score of 0.052. Code diff hunk 714 is mapped to the node SquareList method in the dependency graph which has a connected component score of 3, Page Rank of 0.237, and a combined score of 711. Code diff hunk 716 is also mapped to the node SquareList method in the dependency graph which has a connected component score of 3, Page Rank of 0.237, and a combined score of 711.

Based on these scores, code diff hunks 714 and 716 are prioritized over code diff hunk 712 and based on the value of k, at least code diff hunks 714 and 716 are included in the prompt to the large language model over the code changes in the import statement of code diff hunk 712.

Operating Environments

Figure 8:
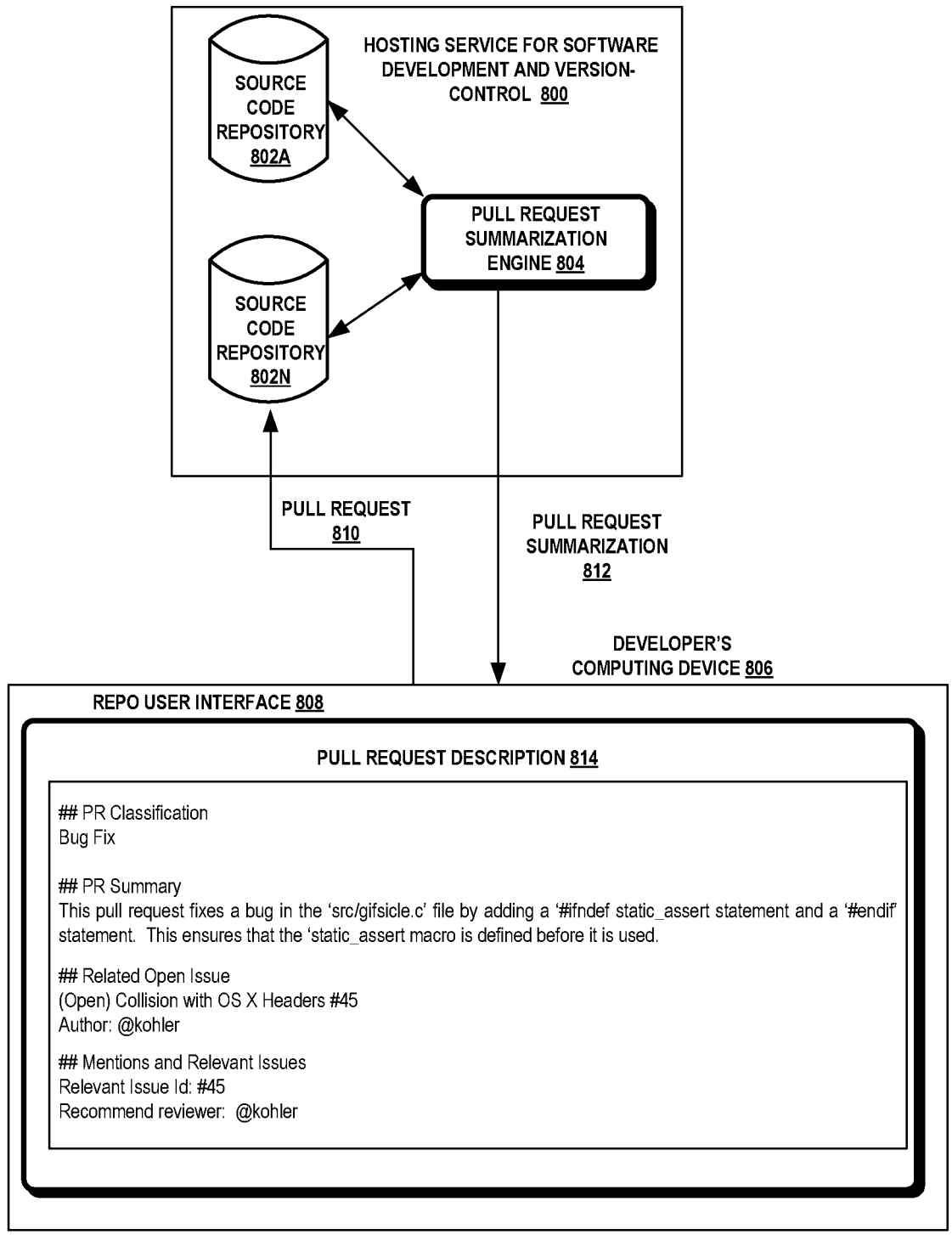
FIG. 8 is a schematic diagram illustrating a first exemplary operating environment of the pull request summarization system in a version-controlled source code repository.

Attention now turns to a description of an exemplary system employing the pull request summarization system. Turning to FIG. 8, there is shown a hosting service for software development and version control 800. The hosting service 800 may be a web service accessed through a network, such as the Internet. The hosting service 800 may be part of a software development environment.

The hosting service 800 includes one or more source code repositories 802A-802N ("802") and a pull request summarization engine 804. In an aspect, the pull request summarization engine 804 may be part of a version-control system associated with the source code repositories 802. The source code repositories 802 store source code files, documents, text files, metadata, script files, test data, and other data.

The hosting service 800 interacts with a developer's computing device 806 having a copy of a source code file stored in one of the source code repositories. A developer via the developer's computing device 806 may initiate a pull request 810 to commit changes back to a version of the source code file stored in the hosting service. The pull request summarization engine 804 contains the components shown in FIG. 1 and performs the operations described with respect to FIG. 1. The pull request summarization engine 804 generates a code diff hunk for each code change, prioritizes the code diff hunks, creates a prompt to a large language model given the prompt, and obtains a classification and summarization for each of the top-k code diff hunks. The pull request summarization engine 804 obtains related issues and suggests code reviewers for the pull request 810. The pull summarization output 812 is sent to the developer 806 or code reviewer and displayed in a user interface 808 and includes the classification, summary, related issues and suggested code reviewers for the pull request. The developer may submit additional pull requests including additional changes and eventually the changes are merged into the source code file of the hosting service.

In an aspect, the pull request summarization 812 is automatically displayed in the pull request description field 814 of the repository's user interface. For example, in GitHub, there is a user interface that shows the data associated with a pull request and includes a section entitled Pull Request Description. The user interface allows a code reviewer to view the pull request description and approve or disapprove the code changes quickly. The approved code diff hunks are then automatically merged back into the main branch of the repository.

Figure 9:
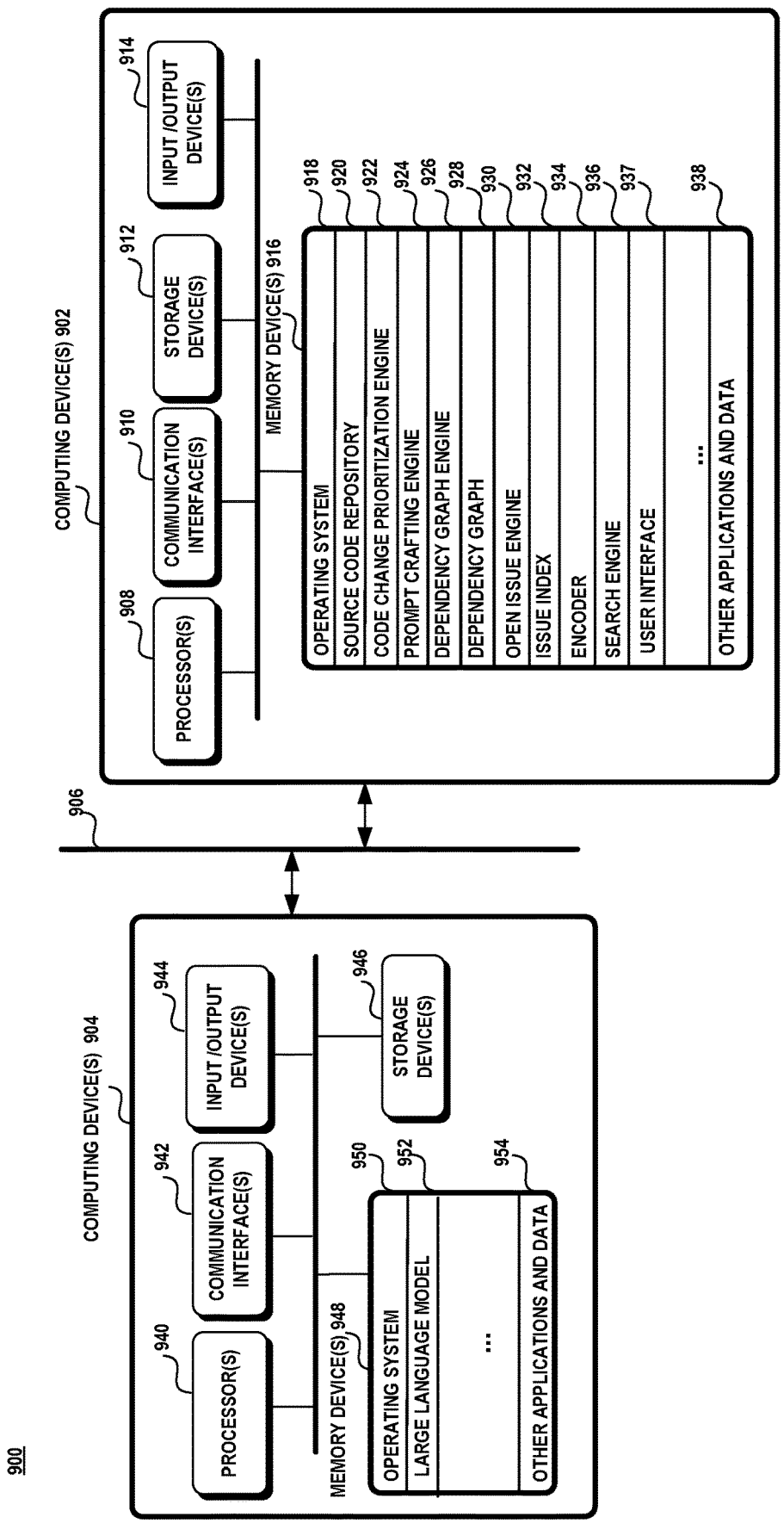
FIG. 9 is a block diagram illustrating a second exemplary operating environment.

Attention now turns to a discussion of a second exemplary operating environment 900. FIG. 9 illustrates an exemplary operating environment 900 having one or more computing devices 902, 904 communicatively coupled to a network 906. In one aspect, the generation of the prompt and the creation of the dependency graph and issue index may be processed on one computing device 902 and the large language model may be hosted as a service on a second computing device 904. In another aspect, the generation of the prompt is associated with one computing device, the dependency graph and the issue index may be hosted on a separate computing device and the large language model hosted on a separate service. The aspects of the operating environment are not constrained to a particular configuration.

The computing devices 902, 904 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

A computing device 902, 904 may include one or more processors 908, 940, one or more communication interfaces 910, 942, one or more storage devices 912, 946, one or more input/output devices 914, 944, and one or more memory devices 916, 948. A processor 908, 940 may be any commercially available or customized processor and may include dual microprocessors and multi-processor architectures. A communication interface 910, 942, facilitates wired or wireless communications between the computing device 902, 904 and other devices. A storage device 912, 946 may be computer-readable medium that does not contain propagating signals, such as modulated data signals transmitted through a carrier wave. Examples of a storage device 912, 946 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 912, 946, in a computing device 902, 904. The input/output devices 914, 944 may include a keyboard, mouse, pen, voice input device, touch input device, display, speakers, printers, etc., and any combination thereof.

A memory device 916, 948 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 916, 948 may also include one or more external storage devices or remotely located storage devices that do not pertain to propagated signals, such as modulated data signals transmitted through a carrier wave.

The memory device 916, 948 may contain instructions, components, and data. A component is a software program that performs a specific function and is otherwise known as a module, program, component, and/or application. The memory device 916 may include an operating system 918, a source code repository 920, code change prioritization engine 922, a prompt crafting engine 924, a dependency graph engine 926, a dependency graph 928, an open issue engine 930, an issue index 932, an encoder 934, a search engine 936, a user interface 937 and other applications and data 938. Memory device 948 may include an operating system 950, a large language model 952, and other applications and data 954.

The computing devices 902, 904 may be communicatively coupled via a network 906. The network 906 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 906 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Evaluation Results

Figure 10:
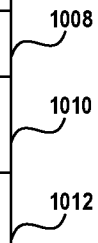
FIG. 10 shows the results of an evaluation of the various prompt crafting strategies used to generate a pull request summary.

FIG. 10 shows the evaluation results for the pull request summary task of the large language model for three different prompt crafting strategies 1000. The three prompt crafting strategies 1002 include: no ranking, where all code diffs are included in the prompt 1008; ranking by the code diff hunk size 1010; and ranking by selecting the top-k code diffs having the most impact on a repository as determined from the dependency graph 1012. The evaluation metrics include pull request coverage 1004 and the Bidirectional Encoder Representations from Transformer (BERT) score metric 1006. The pull request coverage 1004 is the ratio of the number of pull request summaries the model was able to generate using the particular prompt crafting strategy over the total number of requests made to the model for a pull request summary.

The BERT score 1006 is a measure of the similarity between two natural language texts. For the pull request summarization system, the BERT score is a measure of the similarity between the pull request summary generated by the large language model given a prompt of a particular prompt crafting strategy and the user-created ground truth summary. A user-created ground truth summary is known to be true as opposed to information provided by inference. The BERT score is calculated by considering the cosine similarity between BERT embeddings of a predicted pull request summary and a benchmark summary.

In an aspect, the BERT F1 score 1006 is used as an evaluation measure. The BERT F1 score matches each token in the model-generated pull request summary with each token in the ground truth summary to compute recall and each token in the ground truth summary to a token in the model-generated pull request summary to compute precision. The F1 measure is a combination of the recall, R, and precision, P, measures which is represented mathematically as follows:

$$P = \frac{1}{N}\sum_{i+1}^{N} \max_{j=1}^{M} \cos(e_i, r_j),$$

$$R = \frac{1}{M}\sum_{j=1}^{M} \max_{i=1}^{N} \cos(e_i, r_j),$$

$$F1 = \frac{2PR}{P+R},$$

where $e_i$ and $r_j$ represent the embeddings of the i-th token in the model-generated pull request summarization and the j-th token in the ground truth summary, respectively. N represents the total number of tokens in the model-generated pull request summarization and M denotes the number of tokens in the ground truth summary, and cos is the cosine similarity.

As shown in FIG. 10, the prompt crafting strategy that does not rank the code diffs has a pull request coverage of 39.9% and a BERT F1 score of 79.5%. The prompt crafting strategy that ranks the code diffs by size has a pull request coverage of 46.5% and a BERT F1 score of 94.8%. The prompt crafting strategy of ranking the code diffs by most impacted dependency has a pull request coverage of 48.4% and a BERT F1 score of 98.8%.

The inclusion of the top-k code diff hunks in the prompt for a large language model to generate a pull request summarization and classification significantly outperforms the techniques that do not use ranking or rank by size. Hence, the technique disclosed herein significantly improves the automation of the pull request summarization and classification.

One of ordinary skill in the art understands that the techniques disclosed herein are inherently digital. The operations used to generate the dependency graph, to prioritize the code changes of a pull request, and to generate the pull summarization output are inherently digital. The human mind cannot interface directly with a CPU or network interface card, or other processor, or with RAM or other digital storage, to read or write the necessary data and perform the necessary operations disclosed herein.

The embodiments are also presumed to be capable of operating at scale, within tight timing constraints in production environments (e.g., version-control source code repository, software development environment), and in testing labs for production environments as opposed to being mere thought experiments. Hence, the human mind cannot perform the operations described herein in a timely manner and with the accuracy required for the intended uses.

Conclusion

A system is disclosed comprising: a processor; and a memory that stores at least one program that is configured to be executed by the processor. The at least one program includes instructions to perform actions that: obtain a plurality of code changes from a pull request of a repository, wherein a code change represents a change to a file, class or method of the repository; prioritize the plurality of code changes based on a score that represents an impact of a code change on the files, classes and methods in the repository; rank the plurality of code changes based on top-k highest scores; generate a first prompt to a large language model comprising top-k code changes; obtain from the large language model, given the prompt, a summary of the top-k code changes; and display the summary in a pull request description for the pull request in the repository.

In an aspect, the at least one program includes instructions to perform actions that: perform code review of a top code change; receive input on outcome of the code review of the top code change; upon successful outcome of the code review of the top code change, merge the code change back to the repository.

In an aspect, the at least one program includes instructions to perform actions that: obtain from the large language model, given the prompt, a classification of the top-k code changes. In an aspect, the at least one program includes instructions to perform actions that: generate an open issue index comprising a plurality of open issues associated with the repository, wherein the open issue index is accessed through an embedding of an issue. In an aspect, the at least one program includes instructions to perform actions that: search the open repository index for an issue related to the summary of the top-k code changes using an embedding of the summary of the top-k code changes.

In an aspect, the at least one program includes instructions to perform actions that: extract from the retrieved issue at least one code reviewer to review the pull request. In an aspect, the at least one program includes instructions to perform actions that: output the summary of the top-k code changes, the classification of the top-k code changes, a related open issue, and the at least one code reviewer into the pull request description of the pull request.

A computer-implemented method is disclosed, comprising: retrieving a plurality of code changes from a pull request; scoring each code change based on an impact of a code change on the files, classes and methods of the repository; ranking the code changes based on a respective score; selecting top-k code changes having highest scores; generating a prompt to a large language model comprising the top-k code changes; and obtaining from the large language model, given the prompt, a summary of the pull request, wherein the summary comprises a description of the top-k code changes.

In an aspect, the computer-implemented method further comprises: reviewing the top code change; receiving input on outcome of the review of the top code change; upon successful outcome of the review of the top code change, merging the code change back to the repository. In an aspect, the computer-implemented method further comprises: obtaining from the large language model, given the prompt, a classification of the top-k code changes. In an aspect, the computer-implemented method further comprises: obtaining at least one open issue from the repository associated with the top-k code changes based on the at least one open issue matching the summary.

In an aspect, the computer-implemented method further comprises: extracting from the at least one open issue at least one code reviewer to review the pull request. In an aspect, the computer-implemented method further comprises: displaying in a pull request description field of the pull request, the summary of the top-k code changes, a classification of the top-k code changes, the at least one open issue, and the at least one code reviewer. In an aspect, the large language model is a conversational pre-trained generative neural transformer models with attention.

A hardware storage device is disclosed having stored thereon computer executable instructions that are structured to be executable by a processor of a computing device to thereby cause the computing device to perform actions that: generate a dependency graph for a repository, wherein the repository comprises source code files having methods and classes, wherein the dependency graph comprises a plurality of nodes representing the source code file, methods and classes within the repository, an edge between two nodes represents a dependency between two nodes; obtaining a pull request comprising a plurality of code changes; mapping each of the plurality of code changes to a respective node in the dependency graph; generate a score for each of the plurality of code changes based on a size of connected components of the respective mapped node in the dependency graph and a page rank of the respective mapped node; selecting top-k code diff hunks based on highest scores; generate a prompt to a large language model, wherein the prompt comprises top-k code changes; obtain from the large language model a natural language summarization of the top-k code changes of the pull request; and output the natural language summarization of the top-k code changes in the pull request.

In an aspect, the hardware device has stored thereon computer executable instructions that are structured to be executable by a processor of a computing device to thereby cause the computing device to perform actions that: obtain from the large language model a classification of the top-k code changes in the pull request.

In an aspect, the hardware device has stored thereon computer executable instructions that are structured to be executable by a processor of a computing device to thereby cause the computing device to perform actions that: search for a related open issue of the repository based on a similarity of an embedding of the related open issue to an embedding of the natural language summarization of the pull request.

In an aspect, the hardware device has stored thereon computer executable instructions that are structured to be executable by a processor of a computing device to thereby cause the computing device to perform actions that: extract at least one code reviewer from the related open issue of the repository.

In an aspect, the hardware device has stored thereon computer executable instructions that are structured to be executable by a processor of a computing device to thereby cause the computing device to perform actions that: output the classification, related open issue and the at least one code reviewer in the pull request.

In an aspect, the large language model is a conversational pre-trained generative neural transformer models with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

In an aspect, the pull request summarization system may be part of a software development environment that interacts with a source code version control system. The software development environment may be an integrated development environment or other application having the tools for creating, maintaining, building, editing, testing, and packaging a software application. A developer may make changes to a source code file and issue a pull request to merge the changes back to the main branch. The pull request summarization system is then used to generate a summary, classification, issue linking, and/or code reviewer suggestion for the top-k code changes in the pull request. The code changes are reviewed in order of the top-k ranking and then upon approval, merged back into the repository.

In an aspect, a machine learning model may be configured to perform the code review process. The machine learning model may be a large language model given a prompt with instructions to perform the code review process, the top-k code diff hunks, the summarization of the pull request and examples of a code review for the same classification of the pull request. Alternatively, a machine learning model may be a custom model trained to perform the code review process by fine-tuning, a pre-trained model with code review samples to learn to predict whether a code diff hunk should be approved and merged back into a main branch or perform additional processing. The code diff hunks would be analyzed in the ranked order with the most impacted code changes being reviewed prior to lower-ranked code changes. The model would return a response indicating whether to approve a code change or provide comments on how to improve the code change. Upon the model approving a code change, the system would automatically merge the code change back to the repository.

In an aspect, each code change is reviewed separately in the order of the top-k ranking. Upon a successful review, the code change is then merged back into the repository and then the next ranked code change is reviewed. In this manner, the code review process takes into account the current state of the content of the master branch since the method controls the order in which the changes are merged back into the repository.

In an aspect, a reviewer provides a response to the pull request summarization output and provides feedback on the outcome of a review. Upon successful output, the code change is merged back into the repository.

What is claimed:

1. A system comprising:
   a processor; and
   a memory that stores at least one program that is configured to be executed by the processor, the at least one program includes instructions to perform actions that:
   obtain a plurality of code changes from a pull request of a repository, wherein a code change represents a change to a file, class or method of the repository;
   prioritize the plurality of code changes based on a score that represents an impact of a code change on the file, class or method in the repository;
   rank the plurality of code changes based on top-k highest scores;
   generate a first prompt to a large language model comprising top-k code changes;
   obtain from the large language model, given the first prompt, a summary of the top-k code changes; and
   display the summary in a pull request description for the pull request in the repository.

2. The system of claim 1, wherein the at least one program includes instructions to perform actions that:
   perform code review of a top code change;
   receive input on outcome of the code review of the top code change; and
   upon successful outcome of the code review of the top code change, merge the code change back to the repository.

3. The system of claim 1, wherein the at least one program includes instructions to perform actions that:
   obtain from the large language model, given the first prompt, a classification of the top-k code changes.

4. The system of claim 1, wherein the at least one program includes instructions to perform actions that:
   generate an open issue index comprising a plurality of open issues associated with the repository, wherein the open issue index is accessed through an embedding of an issue.

5. The system of claim 4, wherein the at least one program includes instructions to perform actions that:
   search the open issue index for an issue related to the summary of the top-k code changes using an embedding of the summary of the top-k code changes.

6. The system of claim 5, wherein the at least one program includes instructions to perform actions that:
   extract from the retrieved issue at least one code reviewer to review the pull request.

7. The system of claim 6, wherein the at least one program includes instructions to perform actions that:
   output the summary of the top-k code changes, the classification of the top-k code changes, a related open issue, and the at least one code reviewer into the pull request description of the pull request.

8. A computer-implemented method, comprising:
   retrieving a plurality of code changes from a pull request of a repository;
   scoring each code change based on an impact of a code change on files, classes and methods of the repository;
   ranking the plurality of code changes based on a respective score;
   selecting top-k code changes having highest scores;
   generating a prompt to a large language model comprising the top-k code changes having highest scores; and
   obtaining from the large language model, given the prompt, a summary of the pull request, wherein the summary of the pull request comprises a description of the top-k code changes.

9. The computer-implemented method of claim 8, comprising:
   reviewing a top code change;
   receiving input on outcome of a review of the top code change; and
   upon successful outcome of the review of the top code change, merging the code change back to the repository.

10. The computer-implemented method of claim 8, comprising:
    obtaining from the large language model, given the prompt, a classification of the top-k code changes.

11. The computer-implemented method of claim 8, comprising:
    obtaining at least one open issue from the repository associated with the top-k code changes based on the at least one open issue matching the summary of the pull request.

12. The computer-implemented method of claim 11, comprising:
    extracting from the at least one open issue at least one code reviewer to review the pull request.

13. The computer-implemented method of claim 12, comprising:
    displaying in a pull request description field of the pull request, the summary of the top-k code changes, a classification of the top-k code changes, the at least one open issue, and the at least one code reviewer.

14. The computer-implemented method of claim 8, wherein the large language model is a conversational pre-trained generative neural transformer models with attention.

15. A hardware storage device having stored thereon computer executable instructions that are structured to be executable by a processor of a computing device to thereby cause the computing device to perform actions that:
    generate a dependency graph for a repository, wherein the repository comprises source code files having methods and classes, wherein the dependency graph comprises a plurality of nodes representing the source code files, methods and classes within the repository, wherein an edge between two nodes represents a dependency between the two nodes;
    obtaining a pull request comprising a plurality of code changes;
    mapping each of the plurality of code changes to a respective node in the dependency graph;
    generating a score for each of the plurality of code changes based on a size of connected components of the respective mapped node in the dependency graph and a page rank of the respective mapped node;
    selecting top-k code diff hunks based on highest scores;
    generate a prompt to a large language model, wherein the prompt comprises top-k code changes;
    obtain from the large language model a natural language summarization of the top-k code changes of the pull request; and
    output the natural language summarization of the top-k code changes in the pull request.

16. The hardware device of claim 15 having stored thereon computer executable instructions that are structured to be executable by a processor of a computing device to thereby cause the computing device to perform actions that:
    obtain from the large language model a classification of the top-k code changes in the pull request.

17. The hardware device of claim 16 having stored thereon computer executable instructions that are structured to be executable by a processor of a computing device to thereby cause the computing device to perform actions that:
    search for a related open issue of the repository based on a similarity of an embedding of the related open issue to an embedding of the natural language summarization of the pull request.

18. The hardware device of claim 17 having stored thereon computer executable instructions that are structured to be executable by a processor of a computing device to thereby cause the computing device to perform actions that:
    extract at least one code reviewer from the related open issue of the repository.

19. The hardware device of claim 18 having stored thereon computer executable instructions that are structured to be executable by a processor of a computing device to thereby cause the computing device to perform actions that:
    output the classification, related open issue and the at least one code reviewer in the pull request.

20. The hardware device of claim 15, wherein the large language model is a conversational pre-trained generative neural transformer models with attention.

* * * * *